June 20, 1950 — J. P. LINFOR — 2,512,066

ICE BANK CONTROL STRUCTURE

Filed Aug. 1, 1945

INVENTOR.
Joseph P. Linfor
BY Bair & Freeman
Atty's.

Patented June 20, 1950

2,512,066

UNITED STATES PATENT OFFICE 2,512,066

ICE BANK CONTROL STRUCTURE

Joseph P. Linfor, Middlebury, Ind., assignor to Penn Electric Switch Co., Goshen, Ind., a corporation of Iowa Application August 1, 1945, Serial No. 608,282

4 Claims. (Cl. 62—4)

My present invention relates to an ice bank control structure adapted for milk coolers, beverage coolers, water coolers or the like wherein an ice bank of a predetermined size is desired, evaporators where it is desirable to operate a defroster when the frost on the evaporator attains a predetermined thickness, and similar installations.

One object of the invention is to provide a control device having a power element which effects a control operation in response to freezing of a liquid in the power element, the power element being associated with the evaporator coil or other surface on which ice or frost forms in a manner so as to be temperature responsive to both the ice or frost and the evaporator or other surface itself.

Another object is to provide a power element having water or the like therein to be frozen to effect a control operation and an arrangement whereby the power element responds both to the formation of ice on a surface and to the temperature of that surface itself, the latter response being through the medium of a heat conductor which is insulated from the ice formed on the surface.

More specifically, it is an object to provide mounting means for that type of power element which has liquid to be frozen to perform a control function, consisting of a heat conducting support for the power element and insulation in the form of an air chamber surrounding the heat conducting support to prevent it from responding to the temperature of the ice which forms around the outside of the insulating chamber.

Figure 1:
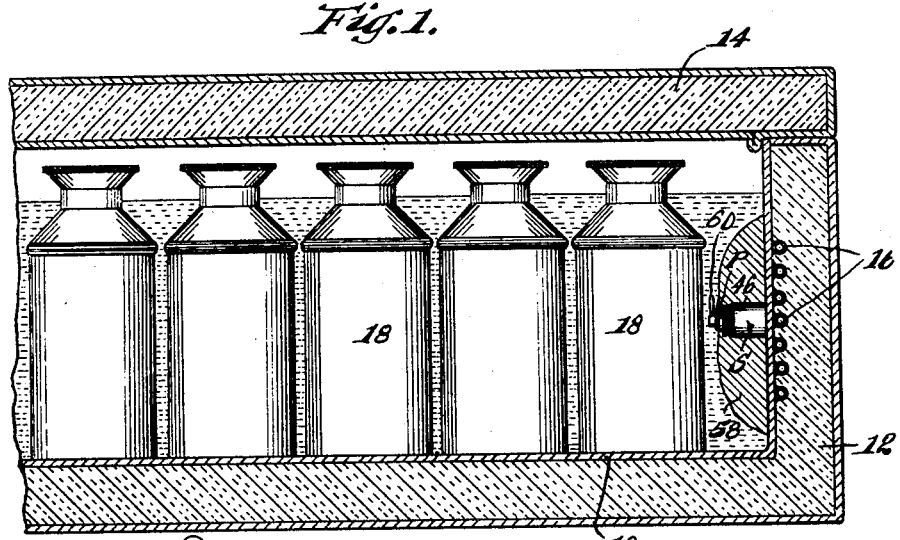
Figure 2:
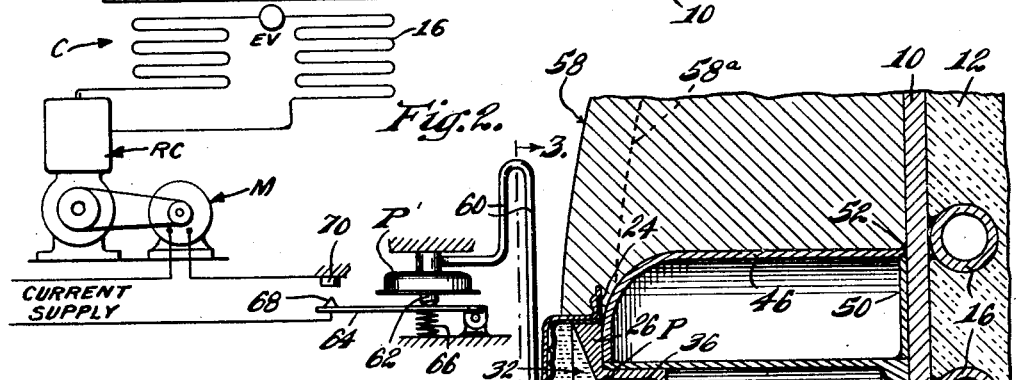
Figure 3:
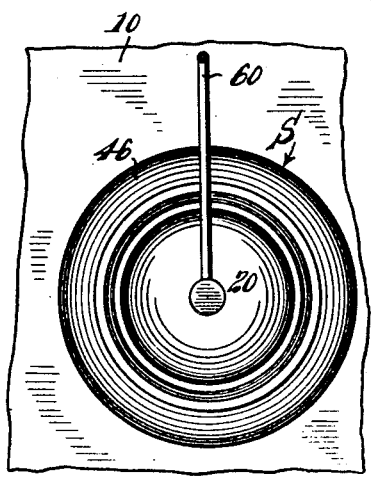

With these and other objects in view, my invention consists in the construction, arrangement and combination of the various parts of my device whereby the objects contemplated are attained, as hereinafter more fully set forth, pointed out in the claims and illustrated in the accompanying drawings, wherein:

Fig. 1 is a vertical sectional view through a milk cooler to which my invention has been applied, the invention being shown in outside elevation and buried in an ice bank;

Fig. 2 is an enlarged sectional view through the control structure and the adjacent portion of the milk cooler showing the relation of parts and showing diagrammatically a hook-up of the power element of the control structure with an electric switch and the refrigerating apparatus for the cooler for automatically controlling the same; and Fig. 3 is an end elevation of the control structure as taken on line 3—3 of Fig. 2.

On the accompanying drawing I have used the reference numeral 10 to indicate a milk cooler tank, the wall of which is suitably insulated, as indicated at 12. An insulated cover 14 is provided, and around the tank wall an evaporator coil 16 is wrapped, the coil being soldered to the tank wall for good heat conduction. This is a usual type of milk cooler which may, of course, have either the coil 16 or a refrigerant chamber built around the tank wall, a milk cooler with the milk cans 18 therein being used merely by way of illustration, as the invention can be applied to many other uses, as will hereinafter appear.

A power element P is provided which consists of a housing 20 having a diaphragm 22 therein and sealed relative thereto, as by solder or the like, at 24. This power element is shown and claimed by Julian P. Miller, Patent No. 2,453,851, issued November 16, 1948, and will here be described merely for the purpose of showing how it operates in conjunction with a supporting means S which I provide for the power element P.

The diaphragm 22, it will be noted, is of the cupped variety, and mounted behind it is a wall 26 soldered, as at 28, whereby within the housing 20 there are two chambers. These chambers are indicated at 30 and 32, the chamber 30 being filled with oil or any suitable hydraulic transmission liquid, and the chamber 32 being filled with distilled water or any suitable liquid which freezes at the control temperature desired.

Within the chamber 32 is a block 34 formed of rubber or any suitable displaceable material which contacts with the inner end of the socket 36 of the wall 26 and with the center of the diaphragm 22. The water within the chamber 32 is indicated at 38 and completely surrounds the block 34, the water having been introduced through a tube 40 after assembly of the parts and the tube then pinched off and soldered, as at 42, to seal the chamber 32.

My support S comprises a heat conducting tube 44 in which the socket member 36 of the wall 26 snugly fits for good heat conduction, the tube itself being made of brass or any suitable metal which is a good conductor of heat. Surrounding the tube 44 is a wall 46 which provides an air space 48 between the two. The left-hand end of the wall 46 in Fig. 2 is turned inwardly and soldered to the tube 44, whereas the right-hand end of the wall 46 is closed in by a disk 50 which is soldered to the tube 44 and the wall 46. The entire assembly is then soldered as at 52 to the tank wall 10, substantially midway of the evaporator coil 16, whereby good heat conduction is had between the support S and the wall 10, and, consequently, the evaporator coil 16.

While I have shown the support S as mounted on a milk cooler tank wall, it may be mounted directly on an evaporator such as one located in the atmosphere of a domestic refrigerator, meat box or the like. When the support S is mounted on an evaporator the power element P would respond to the formation of frost thereon, as will be hereinafter evident.

*Practical operation*

Describing, first, the operation of my ice bank control structure in a milk cooler, the present method of doing this job is to use a temperature bulb in the water and attempt to stop the refrigerant compressor when the ice has built out a predetermined thickness from the walls of the tank and to the bulb. Since the temperature of the water and the temperature of the ice, where they are in contact, are practically the same, it has been found impossible to do this job with a bulb which is only responsive to changes in temperature of the water.

In my arrangement the power element P is supported by the support S at a distance from the tank wall 10 corresponding to the desired thickness of the ice bank 58. Accordingly, when the ice bank builds out to a point where it contacts the housing 20, as shown, the water 38 freezes, thus causing a diametrical contraction of the block 34 which results in its elongation, causing the diaphragm 22 to bend outwardly, thus reducing the volume of the chamber 30 and displacing the transmitting fluid therefrom into a capillary tube 60 which extends from this chamber. The tube 60 communicates with a second power element P' of diaphragm and housing type wherein the introduction of additional transmission fluid extends a pin 62 to move a switch arm 64 in opposition to a spring 66. This results in separating a movable contact 68 from a stationary contact 70. The contacts 68 and 70, of course, are for controlling the circuit to the motor M of the refrigerant compressor RC which supplies refrigerant to the evaporator coils 16 as shown diagrammatically in Figure 2, the coil C being the condenser and EV the expansion valve of the refrigerating apparatus. Thus, when the ice bank 58 builds out to the desired point it effects a stoppage of the refrigerant flow until such time as the ice bank melts back sufficiently to permit the frozen ice in the chamber 32 to thaw out and thus contract, thereby permitting the block 34 to contract linearly and expand diametrically. This results in the spring 66 closing the switch 68—70 again for initiating another operating cycle of the refrigerant compressor RC.

I have found that mere response of the power element P to the temperature of the ice bank is insufficient for satisfactory operation, but that a desired modulating effect can be had by utilizing the heat transmission element 44 for transmitting heat between the evaporator coil 16 and the power element P. The power element is thus subject to the temperature of the evaporator which is, thermally speaking, a part of the tank wall. The housing 20 is then subject to the temperature of the water in the tank 10 and to the ice 58 when it forms out sufficiently far to contact the housing 20. As long as the ice does not contact the housing 20 the water in the tank 10, being just above the freezing point, cannot freeze the water in the power element P. When the ice 58 contacts the housing 20, however, the temperature is lowered sufficiently that the water 38 soon turns to ice. The formation of the ice in the chamber 32 is thus dependent for freezing and thawing upon two temperatures, (1) that of the ice 58 and (2) that transmitted to the power element by the tube 44 from the evaporator coil 16. At the same time, it is necessary to insulate the heat transmitting tube 44 from the ice 58 so that it is not responsive to the temperature of the ice. This is accomplished by means of the air space 48, or any suitable arrangement such as the use of heat insulating material in place of the air space 48. By soldering the support S to the wall 10 good heat conduction is had for the tube 44 as it is important that a portion of the power element P respond to the temperature of the coil 16 or any surface on which the formation of ice or frost is to be controlled.

Another important purpose served by the heat transmitting element 44 is to prevent non-response of the power element when the ice bank 58 melts away from the wall 10. Slight heat from the outside, through the insulation 12, causes the ice bank to melt adjacent the wall 10, and it is desirable that the power element P respond to this condition in order to build up the ice bank again between the wall 10 and the melted-away portion of the ice bank. Accordingly, as soon as there is such melting away the wall 10 is at a temperature higher than 32 degrees, and such temperature is transmitted through the tube 44 to the power element P, thus melting the ice therein sufficiently to permit the switch 68—70 to close again. This will cause the refrigeration mechanism to come into operation and chill the wall 10 for freezing the water between it and the ice bank, and when the water is thus frozen the wall 10 is again at 32 degrees and absorbs heat from the tube 44 for freezing the water in the power element P and thus opening the control switch.

My ice bank control structure is an efficient device from the standpoint of initial build-up of the ice bank and subsequent holding of the ice bank at a predetermined point. Initially, that is, before there is any build-up of an ice bank, the water in the tank 10 being at higher than 32 degrees, will effect maintenance of the switch 68—70 closed until the ice bank has built out to the housing 20 to cause the switch to open. Thus the refrigeration mechanism remains in operation until the ice bank is built up. Thereafter, any deposit of the milk cans 18 in the water in the tank 10 will cause melting of the ice bank on the inner side, thus exposing the housing 20 to the water temperature rather than the ice temperature, and thus causing the frozen water 38 to melt for bringing the refrigeration mechanism into operation. Thus the power element P responds either to melting of the ice 58, due to the temperature of the water in the tank 10 being raised or melting of the ice 58 next to the tank wall 10, due to heat seepage through the insulation 12. All contingencies are thus met by the arrangement wherein temperature is transmitted to the power element P both by contact of the ice bank 58 therewith and heat transmission from the wall 10 by the tube 44.

My control structure may be mounted directly on an evaporator within a refrigerated space where it is desirable to control the formation of frost. The support S, in that case, would conduct heat between the evaporator and the power element, whereas the frost, when it built out to the housing 20, would cause freezing of the water 38 and operation of the control structure at that point for either shutting down the refrigeration mechanism for a defrosting cycle or operating a defrosting mechanism, such as a heater for the evaporator. The power element would thus be responsive to the temperature of the evaporator and the frost, the same as in Fig. 2, where it is responsive to the tank wall 10 and the ice.

Similarly, the support S may be mounted on any other type of surface on which ice may be formed. In all cases the power element has a relatively large range of operation at a critical point, such as 32 degrees, or if some other control point is desired then a liquid different from water could be used in the chamber 32. The change in volume of the water 38 to ice, and vice versa, is relatively rapid and great at the control point, and this, of course, is a very desirable consideration, particularly since it is only this one point at which it is desirable for the switch to open or close. Distinguished from an ordinary temperature responsive control device, therefore, my control structure has considerable movement for control purposes at one critical temperature, whereas ordinary temperature control devices move slowly throughout their range of operation and the control point is not marked with considerable movement, as in my arrangement.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In an ice bank control structure, a power element having liquid therein, said element being adapted for operating a control device having its control point determined by the freezing and thawing of said liquid, supporting means for said power element in relation to a surface on which ice or frost is formed by an evaporator under control of a control device operated by said power element, said supporting means including a heat transmitting element from said surface to said power element, and means for insulating said heat transmitting element with relation to the ice or frost formed on said surface, said ice or frost, upon attaining a predetermined thickness, contacting said power element to effect freezing of the liquid therein.

2. An ice bank control structure comprising a power element having liquid therein adapted to alternately freeze and thaw at a temperature substantially that of the freezing point of water, supporting means for said power element in relation to a wall on which ice is formed by an evaporator, said supporting means including a heat transmitting element from said wall to said power element, and means for insulating said heat transmitting element with relation to the ice formed on said wall, said ice, upon attaining a predetermined thickness, contacting said power element.

3. In an ice bank control structure, a power element having liquid therein, supporting means for said power element in relation to an evaporator, said supporting means including a heat transmitting element from said evaporator to said power element, and means for insulating said heat transmitting element with relation to ice formed on said evaporator, said power element being mounted beyond said last means whereby when the ice forms entirely thereover it contacts said power element for freezing the liquid therein.

4. A control structure comprising a power element, means for supporting said power element in relation to an evaporator comprising a heat transmitting connection surrounded by insulation comprising an air space for isolating the heat transmission connection from ice formed on said evaporator, said heat transmitting connection supporting said power element in spaced relation to said evaporator with the power element beyond the connection and thereby contactable by the ice after it completely imbeds said connection.

JOSEPH P. LINFOR.

REFERENCES CITED

The following references are of record in the file of this patent:

UNITED STATES PATENTS

| Number | Name | Date |
| --- | --- | --- |
| 2,117,104 | Rorison | May 10, 1938 |
| 2,385,243 | Wiegers | Sept. 18, 1945 |

FOREIGN PATENTS

| Number | Country | Date |
| --- | --- | --- |
| 181,894 | Switzerland | Apr. 1, 1936 |